No. 835,933. PATENTED NOV. 13, 1906.
C. A. D. BURK.
MEASURING MACHINE.
APPLICATION FILED JULY 3, 1906.
2 SHEETS—SHEET 1.
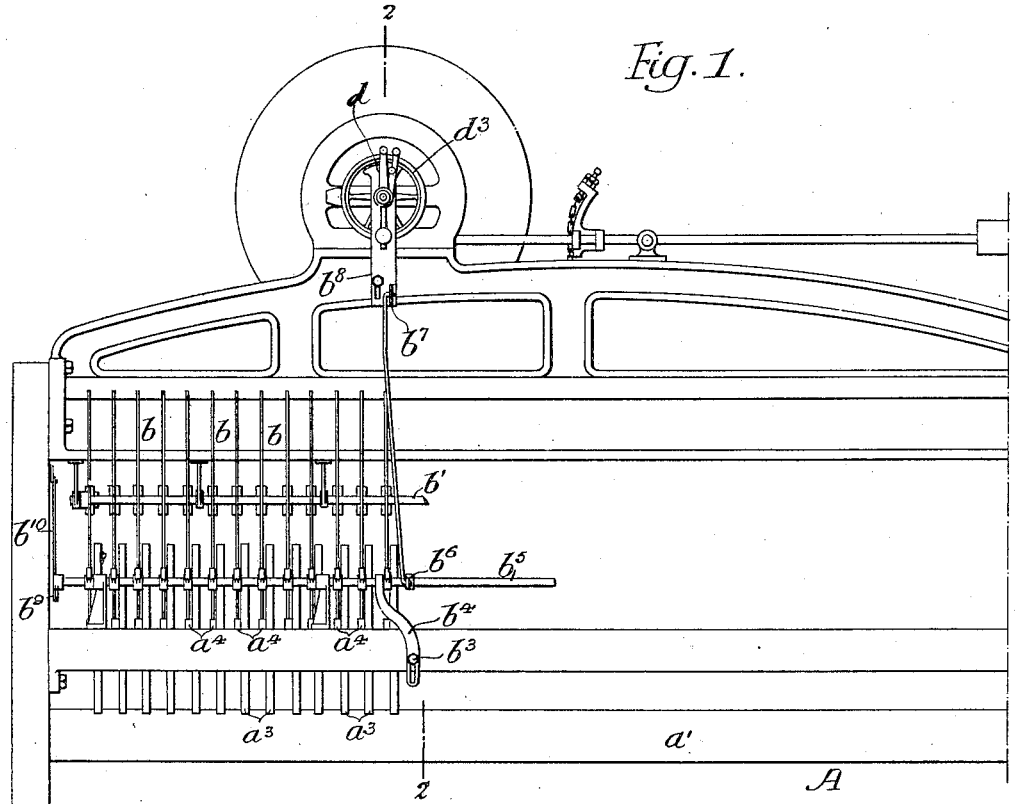
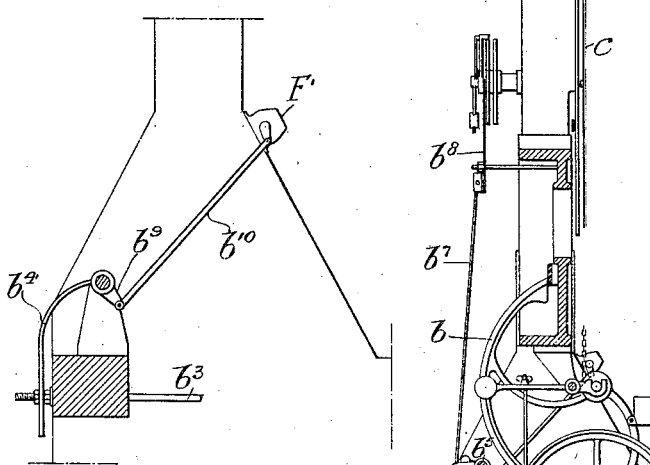
Witnesses:
Walter F. Pullinger
Wills A. Burrowes
Inventor
Charles A. D. Burk
by its Attorneys,
Howson & Howson

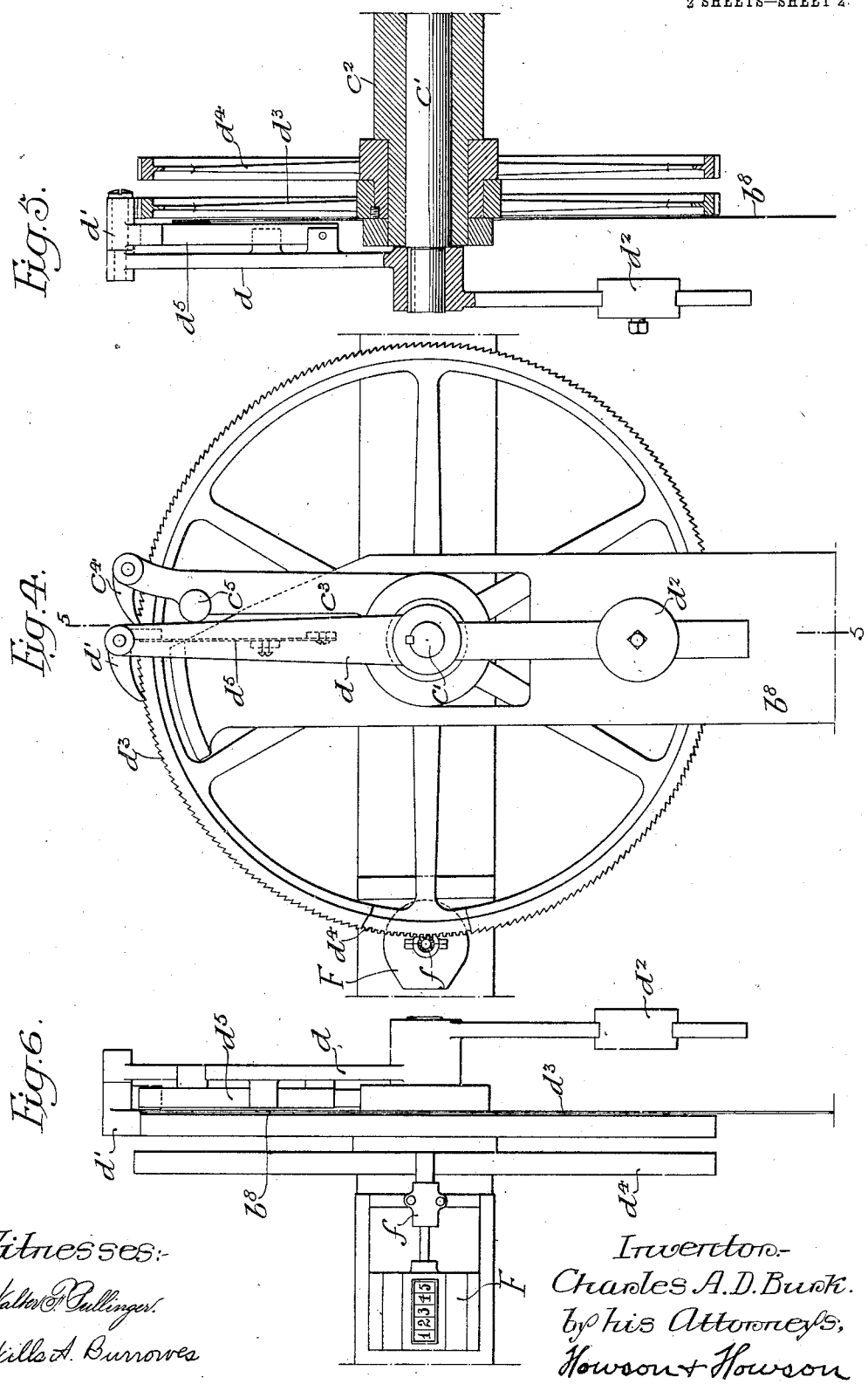

UNITED STATES PATENT OFFICE.

CHARLES A. D. BURK, OF PHILADELPHIA, PENNSYLVANIA.

MEASURING-MACHINE.

No. 835,933.　　　Specification of Letters Patent.　　　Patented Nov. 13, 1906.

Application filed July 3, 1906. Serial No. 324,578.

*To all whom it may concern:*

Be it known that I, CHARLES A. D. BURK, a citizen of the United States, residing in Philadelphia, Pennsylvania, have invented certain Improvements in Measuring - Machines, of which the following is a specification.

One object of my invention is to provide novel mechanism particularly designed for application to a leather-measuring machine for registering the total area of all the skins measured and also for providing means whereby the average area of any particular lot of skins may be ascertained in a relatively simple manner.

I further desire to provide registering means for attachment to a leather-measuring-machine which shall indicate the total number of skins passed through the device and shall simultaneously register the total areas of the skins in terms of units of surface.

I further desire to provide a totaling mechanism with an attachment for preventing its accidental operation when the various measuring elements of the machine to which the device is attached are returned to their normal positions after a measurement has been taken.

These objects I attain as hereinafter set forth, reference being had to the accompanying drawings, in which—

Figure 1 is a rear elevation of part of a well-known form of leather-measuring machine, showing my invention as applied thereto. Fig. 2 is a vertical section taken on the line 2 2, Fig. 1. Fig. 3 is a somewhat-enlarged elevation illustrating the connections for the skin-counting instrument. Fig. 4 is a rear elevation, on an enlarged scale, illustrating part of the totaling mechanism comprising my invention. Fig. 5 is a vertical section taken on the line 5 5, Fig. 4; and Fig. 6 is a front elevation of the mechanism shown in Fig. 4.

In the above drawings, A represents the frame of a well-known machine for indicating the area, usually in square feet or fractions thereof, of skins, and this includes a table $a$, over which the skins are fed into the machine, and a roller $a'$, supported with its top at substantially the same level as said table. Above said roller and supported on a spindle $a^2$ are a series of independently-rotatable wheels $a^3$, mounted at a fixed distance from each other and each having keyed or otherwise attached to it a small pinion, (indicated at $a^4$.) Said wheels are capable of slight bodily movement, and when so moved their pinions are constructed to mesh with toothed segments $b$, all of the latter being independently supported on a spindle $b'$.

By mechanism well known to the art and which has been omitted from the drawings, since it forms no part of the present invention, the various segments are connected to an indicator-needle $c$, rotatably supported at the center of a dial C upon a spindle or shaft $c'$, carried on the frame A of the machine in any desired manner.

Each of the toothed segments $b$ is provided with a pawl $b^2$, whereby it is maintained in any position to which it is moved, and a bar $b^3$ is provided, whereby through the medium of an arm $b^4$ the shaft $b^5$, on which the pawls are carried, may be turned to simultaneously release all of these and permit the toothed segments to return to their normal positions under the action of mechanism not shown.

With the idea of providing means for totaling the various readings given by the needle $c$ I fix on the spindle $c'$ an arm $d$, which carries at one end a pawl $d'$ and at the other an adjustable weight $d^2$. The bearing $c^2$ for the spindle $c'$ is so formed as to provide a support for two rigidly-connected wheels $d^4$ and $d^3$, of which the first is provided with gear-teeth and the second is provided with ratchet-teeth. An arm $c^3$ is rigidly fixed to the bearing $c^2$ and carries at its upper end a second pawl $c^4$, which with the pawl $d'$ of the arm $d$ engages the ratchet-teeth of the wheel $d^3$.

It will be understood that the weight $d^2$ on the arm $d$ tends to balance this in any position, and in addition I provide a support $c^5$ on the arm $c^3$, whereby movement of said arm $d$ past the perpendicular is prevented. A flat spring $d^5$, as shown in Figs. 5 and 6, is provided for the purpose of maintaining the pawl $d'$ in engagement with the teeth of the ratchet-wheel $d^3$.

Carried on the frame A in a suitable position is any desired form of registering instrument F, to the spindle of which is secured a small pinion $f$, meshing with the teeth of the wheel $d^4$, as shown best in Figs. 4 and 6.

The pawl-shaft $b^5$ has upon it an arm $b^6$, connected, by means of a link $b^7$, to a vertically-movable plate $b^8$, which in the present instance is mounted so as to be guided on the bearing $c^2$ and is of such a length that when the shaft $b^5$ is turned to release the pawls said plate will be raised for a distance sufficient to bring its upper edge into engagement with the pawl $d'$, so as to lift this latter out of contact with the ratchet-teeth. Also fixed to the shaft $b^5$ is an arm $b^6$, connected by a link $b^{10}$ to a second registering instrument $F'$, the connections being such that said instrument will be actuated to an extent of one unit each time the shaft $b^5$ is turned to release its pawls $b^2$.

Under operating conditions it will be understood that the wheels $a^3$ are continuously rotated by any desired driving means, but are so supported that their pinions $a^4$ do not mesh with the toothed segments $b$. When, however, a skin to be measured is passed between the various wheels $a^3$ and the roller $a'$, said wheels are raised to an extent sufficient to bring their pinions into mesh with the teeth of the segments $b$ and a number of said segments are partially rotated to an extent depending upon the lengths of the various portions of the skins engaged by said wheels, the spindle $c'$ being caused to rotate to an extent proportional to the total arc moved through by all of said toothed segments. The needle $c$ therefore gives a reading on the dial in terms of units of area, indicating the area of the skin, and it will be seen that this partial rotation of the spindle is transmitted through the arm $d$ and pawl $d'$ to the ratchet-wheel $d^3$, turning this through the same arc. Since said ratchet-wheel is fixed to the toothed wheel $d^4$, this latter is also turned, and through the medium of the pinion $f$ turns the spindle of the registering instrument $F$, thereby making a permanent record of said area. The rod $b^3$ is pushed inwardly in order to restore the various toothed segments to their normal positions prior to making another measurement, and thereby partially turns the pawl-shaft $b^5$. This releases the pawls $b^2$ and at the same time moves upwardly the link $b^7$ as well as the plate $b^8$, attached to the upper end thereof. Said plate consequently engages the pawl $d'$ and lifts it out of contact with the teeth of the wheel $d^3$, holding it so disengaged until it has been returned to its vertical position by the resetting means employed. I have found this particular feature of my invention to be of material value, since if it were not used there would be a possibility that the arm $d$ after once engaging the stop $c^5$ would make one or more oscillations before coming to rest and possibly move the ratchet-wheel $d^3$ to the extent of one or more teeth. By means of the plate $b^8$, however, the pawl is kept disengaged for a short time until it not only has returned to its normal position, but has ceased to move. The pawl $c^4$ is provided for the purpose of preventing movement of the ratchet-wheel while the arm $d$ is being returned to its normal or zero position and the pawl $d'$ is not engaging it.

It will be seen that in addition to the above actions the pushing inward of the rod $b^3$ operates the recording instrument $F'$ through the medium of the lever-arms $b^4$ $b^9$ and link $b^{10}$, so that in addition to giving a permanent indication of the area of a skin and totaling the areas of successive skins there is also secured a record of the number of skins actually passed through the machine, this latter record resulting from the fact that it is necessary to operate the rod $b^3$ after the passage of each skin through the machine. With the above arrangement of apparatus it will be seen that the average area of a lot of skins may be ascertained simply by dividing the total area as given on the instrument $F$ by the number of skins as given on the instrument $F'$, so that I am enabled to secure accurate indications of the total area as well as of the average area of any desired number of skins.

I claim—

1. The combination of a rotatable shaft, a toothed wheel movable independently thereof, a pawl-carrying arm fixed to said shaft so that its pawl operates on said wheel, a registering instrument actuated by the wheel, means for turning the shaft to operate the registering instrument, means for returning the arm to its normal position after each operation of the shaft, and means for temporarily holding the pawl out of engagement with the teeth of the wheel when it returns to its zero position, substantially as described.

2. The combination of a rotatable shaft, an arm thereon carrying a pawl, a toothed wheel engaged by said pawl, means for returning the arm to its zero position after it has been moved therefrom, and a plate for engaging said pawl and holding it out of contact with the teeth of the wheel while said arm is returning to its zero position, substantially as described.

3. The combination of a rotatable shaft, an arm fixed thereto having a pawl, a wheel rotatable independently of the shaft and having teeth engaged by said pawl, a stationary arm having a second pawl in engagement with the teeth of the wheel, a stop for limiting the movement of the first arm, and a plate having a portion movable into the path of pawl on the movable arm, for holding said pawl as it returns to its zero position out of engagement with the teeth of the wheel, substantially as described.

4. The combination with a measuring-machine, of a shaft rotated by the indicating mechanism of said machine, an arm fixed thereto, a pawl on the arm, a toothed wheel actuated by said pawl, a registering instrument connected to said parts, with means actuated by the resetting mechanism of the measuring-machine for holding the pawl out of engagement with the teeth of said wheel as said arm is returned to its zero position, substantially as described.

5. The combination of a rotatable shaft, a gear-wheel and a ratchet-wheel fixed to each other and rotatable independently of said shaft, a registering instrument actuated by said gear-wheel, an arm on the shaft having a pawl operative on the ratchet-wheel, measuring mechanism connected to revolve the shaft and so actuate the registering instrument, with means for returning the shaft with the arm to its zero position, substantially as described.

6. The combination with a machine for measuring areas having resetting means, of a device controlled partly by the measuring mechanism and partly by the resetting mechanism for totaling the areas measured, and a second device for registering the number of objects measured, substantially as described.

7. The combination with a machine for measuring areas having means for resetting its mechanism, of a device for totaling the areas measured, and a second device for registering the number of objects measured, both of said devices having parts whose operation is controlled by said resetting means, substantially as described.

8. The combination with a machine for measuring areas having a series of toothed segments, of pawls operative on said segments, and means including a shaft for releasing said pawls, with means for totaling the areas of the objects measured, and other means for registering the number of objects measured, both of said means having parts whose operation is controlled by said pawl-controlling shaft, substantially as described.

9. The combination with a measuring-machine, of a rotatable shaft, two wheels concentric with said shaft, but movable independently thereof, one of said wheels having gear-teeth and the other ratchet-teeth, a registering instrument actuated by the gear-wheel, a fixed arm having a pawl in engagement with the teeth of the ratchet-wheel, an arm fixed to the shaft and having a second pawl also operative on said ratchet-wheel, a weight on said arm, and a plate actuated from the measuring-machine for holding said second pawl out of engagement with the ratchet-teeth as the arm returns to its zero position, substantially as described.

10. The combination with a measuring-machine having a series of toothed segments, a series of pawls for said segments, and means including a movable spindle for simultaneously releasing said pawls, with an instrument actuated by the measuring-machine for totaling the areas measured, means including a pawl-carrying arm for connecting said instrument with the measuring means, releasing means actuated by said spindle for holding the pawl of said arm out of engagement with its ratchet-wheel as said arm is returned to its zero position, and other means also actuated by said spindle for registering the number of objects measured, substantially as described.

11. The combination with a measuring-machine having an indicator-shaft, of an arm fixed to said shaft, a pawl on the arm, a ratchet-wheel actuated by said pawl, a registering instrument connected to said ratchet-wheel, means for resetting the measuring-machine including a pawl-carrying shaft and means for turning the same, with a plate for maintaining the pawl of said arm out of engagement with the teeth of the ratchet-wheel, and a link connecting the said plate with the pawl-controlling shaft of the resetting means, substantially as described.

In testimony whereof I have signed my name to this specification in the presence of two subscribing witnesses.

CHARLES A. D. BURK.

Witnesses:
 Wm. E. Shupe,
 Jos. H. Klein.